US011363461B2

(12) United States Patent
Song et al.

(10) Patent No.: US 11,363,461 B2
(45) Date of Patent: Jun. 14, 2022

(54) METHOD FOR MANAGING SECURITY KEY OF MOBILE COMMUNICATION SYSTEM, AND APPARATUS THEREFOR

(71) Applicant: Electronics and Telecommunications Research Institute, Daejeon (KR)

(72) Inventors: Jae Su Song, Daejeon (KR); Seung Kwon Baek, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 22 days.

(21) Appl. No.: 16/987,149

(22) Filed: Aug. 6, 2020

(65) Prior Publication Data

US 2021/0058790 A1    Feb. 25, 2021

(30) Foreign Application Priority Data

Aug. 23, 2019  (KR) .................. 10-2019-0103774
Jul. 24, 2020   (KR) .................. 10-2020-0092005

(51) Int. Cl.
*H04W 12/10* (2021.01)
*H04W 28/06* (2009.01)
*H04W 80/02* (2009.01)
*H04L 9/40* (2022.01)

(52) U.S. Cl.
CPC .......... *H04W 12/10* (2013.01); *H04L 63/123* (2013.01); *H04W 28/06* (2013.01); *H04W 80/02* (2013.01)

(58) Field of Classification Search
CPC ...... H04W 8/00–245; H04W 88/00–06; H04L 63/123
See application file for complete search history.

(56) References Cited

U.S. PATENT DOCUMENTS

| | | | |
|---|---|---|---|
| 2010/0158352 | A1 | 6/2010 | Yu et al. |
| 2011/0187820 | A1 | 8/2011 | Gilboa et al. |
| 2015/0092057 | A1 | 4/2015 | Lee |
| 2015/0358813 | A1* | 12/2015 | Lee ............... H04W 12/041 380/279 |
| 2016/0029213 | A1* | 1/2016 | Rajadurai ....... H04W 12/06 380/283 |
| 2016/0366175 | A1* | 12/2016 | Basu Mallick ..... H04W 76/15 |
| 2017/0123435 | A1 | 5/2017 | Myeong et al. |

(Continued)

FOREIGN PATENT DOCUMENTS

EP          3367199 B1      5/2020

*Primary Examiner* — San Htun
(74) *Attorney, Agent, or Firm* — William Park & Associates Ltd.

(57) ABSTRACT

A security key management method performed in a PDCP layer of a terminal dual-connected to a first cell and a second cell may comprise receiving a PDCP PDU on which ciphering or integrity protection to which a first security key of the first cell or a second security key of the second cell is applied is performed; performing at least one of integrity verification and header decompression for the PDCP PDU based on the first security key; performing at least one of integrity verification and header decompression for the PDCP PDU based on the second security key; and determining a security key applied to the PDCP PDU, based on result of the at least one of integrity verification and header decompression based on the first security key and result of the at least one of integrity verification and header decompression based on the second security key.

20 Claims, 15 Drawing Sheets

(56) References Cited

U.S. PATENT DOCUMENTS

| | | |
|---|---|---|
| 2018/0124865 A1* | 5/2018 | Lee ..................... H04W 80/02 |
| 2019/0065885 A1 | 2/2019 | Li et al. |
| 2019/0080462 A1 | 3/2019 | Jung et al. |
| 2019/0357196 A1* | 11/2019 | Majmundar .......... H04L 1/0076 |
| 2019/0373672 A1* | 12/2019 | Kim ..................... H04W 12/04 |
| 2020/0164515 A1 | 5/2020 | Han |

* cited by examiner

US 11,363,461 B2

METHOD FOR MANAGING SECURITY KEY OF MOBILE COMMUNICATION SYSTEM, AND APPARATUS THEREFOR

CROSS-REFERENCE TO RELATED APPLICATIONS

This application claims priority to Korean Patent Applications No. 10-2019-0103774 filed on Aug. 23, 2019, and No. 10-2020-0092005 filed on Jul. 24, 2020 with the Korean Intellectual Property Office (KIPO), the entire contents of which are hereby incorporated by reference.

BACKGROUND

1. Technical Field

The present disclosure relates generally to a method and an apparatus for managing a security key for data ciphering/integrity of a mobile communication system, and more specifically, to a method and an apparatus for managing a security key for data ciphering and integrity protection in a packet data convergence protocol (PDCP) layer of a mobile communication system.

2. Related Art

In mobile communication, there is a risk of always being exposed to hacking due to the characteristic that radio waves are transmitted in form of Point-To-Multi Point (PtMP). Particularly, there may be two types of the hacking, one is that an unauthorized third party peeps at communication data and the other is that an unauthorized third party intercepts, modifies, and transmits the communication data. In order to prevent the former, ciphering is required, and in order to prevent the latter, an integrity check is required.

In case of the $3^{rd}$ generation partnership project (3GPP) long term evolution (LTE) system and new radio (NR) system, security functions are performed in a packet data convergence protocol (PDCP) layer, and management of a security key is required to perform such the security functions.

SUMMARY

Accordingly, exemplary embodiments of the present disclosure are directed to providing a security key management method of a terminal.

Accordingly, exemplary embodiments of the present disclosure are directed to providing a terminal for performing management of a security key.

According to an exemplary embodiment of the present disclosure, a method of managing a security key, performed in a PDCP layer of a terminal dual-connected to a first cell and a second cell, may comprise receiving a PDCP protocol data unit (PDU) on which ciphering or integrity protection to which a first security key of a PDCP layer of the first cell or a second security key of a PDCP layer of the second cell is applied is performed; performing at least one of integrity verification and header decompression for the PDCP PDU based on the first security key; performing at least one of integrity verification and header decompression for the PDCP PDU based on the second security key; and determining a security key applied to the PDCP PDU, based on a result of the at least one of integrity verification and header decompression based on the first security key and a result of the at least one of integrity verification and header decompression based on the second security key.

The method may be performed in a situation where a security key confusion occurs.

The security key confusion may occur in a handover procedure in which a role of the first cell for the terminal and a role of the second cell for the terminal are switched.

The first cell may be a master cell, and the second cell may be a secondary cell.

When the PDCP PDU is mapped to a radio bearer to which integrity protection is applied, the integrity verification based on the first security key and the integrity verification based on the second security key may be performed for the PDCP PDU.

When the PDCP PDU is mapped to a radio bearer to which integrity protection is not applied, integrity protection may be applied to the radio bearer to which the PDCP PDU is mapped for a predetermined time, and the integrity verification based on the first security key and the integrity verification based on the second security key may be performed for the PDCP PDU.

The predetermined time may be a time during which a dual connectivity-based handover procedure is performed or a time during which a procedure for switching a role of the first cell for the terminal and a role of the second cell for the terminal is performed.

The method may further comprise delivering data deciphered by the first security key to a higher layer when the security key applied to the PDCP PDU is the first security key, and delivering data deciphered by the second security key to the higher layer when the security key applied to the PDCP PDU is the second security key.

The method may further comprise, when errors occur in both the integrity verification or header decompression based on the first security key and the integrity verification or header decompression based on the second security key for the PDCP PDU, performing an error handling procedure.

The first security key or the second security key may be deleted at a time point when a release procedure for the first cell or the second cell is performed; at a time point when one of the first security key and the second security key is determined as being applied to N or more consecutively received PDCP PDUs, wherein N is a natural number equal to or greater than 2; or after a lapse of a predetermined time from a time point when a PDCP PDU to which a previous security key is applied is processed.

According to another exemplary embodiment of the present disclosure, a terminal in a mobile communication system may comprise a processor; a memory electronically communicating with the processor; and instructions stored in the memory and executable by the processor, wherein when executed h the processor, the instructions cause a PDCP layer of the terminal to perform a security key management method, and the security key management method may comprise receiving a PDCP protocol data unit (PDU) on which ciphering or integrity protection to which a first security key of a PDCP layer of the first cell or a second security key of a PDCP layer of the second cell is applied is performed; performing at least one of integrity verification and header decompression for the PDCP PDU based on the first security key; performing at least one of integrity verification and header decompression for the PDCP PDU based on the second security key; and determining a security key applied to the PDCP PDU, based on a result of the at least one of integrity verification and header decompression based on the first security key and a result of the at least one of integrity verification and header decompression based on the second security key.

The security key management method may be performed in a situation where a security key confusion occurs.

The security key confusion may occur in a handover procedure in which a role of the first cell for the terminal and a role of the second cell for the terminal are switched.

The first cell may be a master cell, and the second cell may be a secondary cell.

When the PDCP PDU is mapped to a radio bearer to which integrity protection is applied, the integrity verification based on the first security key and the integrity verification based on the second security key may be performed for the PDCP PDU.

When the PDCP PDU is mapped to a radio bearer to which integrity protection is not applied, integrity protection may be applied to the radio bearer to which the PDCP PDU is mapped for a predetermined time, and the integrity verification based on the first security key and the integrity verification based on the second security key may be performed for the PDCP PDU.

The predetermined time may be a time during which a dual connectivity-based handover procedure is performed or a time during which a procedure for switching a role of the first cell for the terminal and a role of the second cell for the terminal is performed.

The security key management method may further comprise delivering data deciphered by the first security key to a higher layer when the security key applied to the PDCP PDU is the first security key, and delivering data deciphered by the second security key to the higher layer when the security key applied to the PDCP PDU is the second security key.

The security key management method may further comprise, when errors occur in both the integrity verification or header decompression based on the first security key and the integrity verification or header decompression based on the second security key for the PDCP PDU, performing an error handling procedure.

The first security key or the second security key may be deleted at a time point when a release procedure for the first cell or the second cell is performed; at a time point when one of the first security key and the second security key is determined as being applied to N or more consecutively received PDCP PDUs, wherein N is a natural number equal to or greater than 2; or after a lapse of a predetermined time from a time point when a PDCP PDU to which a previous security key is applied is processed.

According to the exemplary embodiments according to the present disclosure, in a situation where a security key confusion problem occurs, the terminal can accurately determine a security key applied to a received PDCP PDU. Particularly, when role switching between a master cell and a secondary cell occurs in a dual connectivity-based handover procedure, according to the exemplary embodiments of the present disclosure, a security key confusion problem due to a change of a security key due to the role switching can be efficiently solved.

BRIEF DESCRIPTION OF DRAWINGS

Exemplary embodiments of the present disclosure will become more apparent by describing in detail embodiments of the present disclosure with reference to the accompanying drawings, in which.

Figure 1:
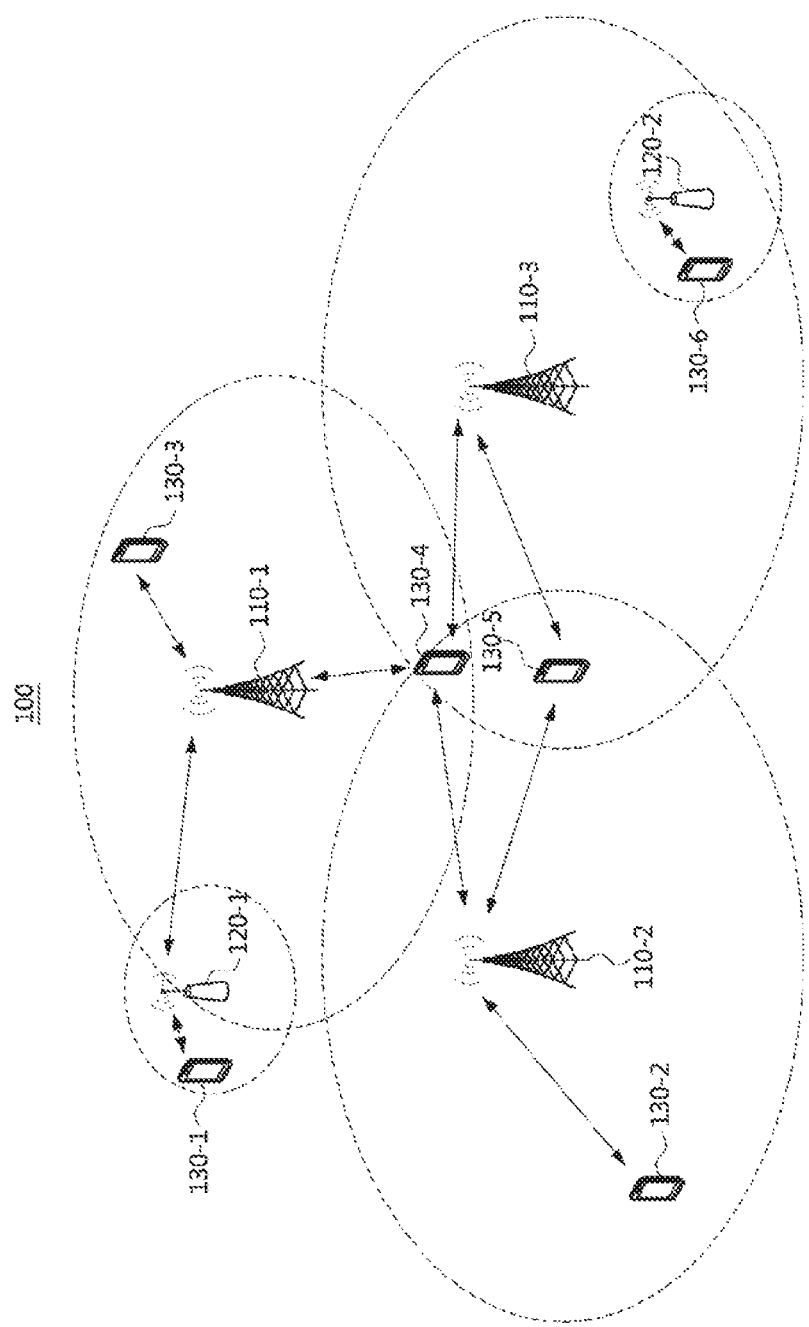
FIG. 1 is a conceptual diagram illustrating a first exemplary embodiment of a wireless communication network.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

While the present disclosure is susceptible to various modifications and alternative forms, specific embodiments are shown by way of example in the drawings and described in detail. It should be understood, however, that the description is not intended to limit the present disclosure to the specific embodiments, but, on the contrary, the present disclosure is to cover all modifications, equivalents, and alternatives that fall within the spirit and scope of the present disclosure.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present disclosure. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present disclosure pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present disclosure will be described in greater detail with reference to the accompanying drawings. To facilitate overall understanding of the present disclosure, like numbers refer to like elements throughout the description of the drawings, and description of the same component will not be reiterated.

A communication system to which exemplary embodiments according to the present disclosure are applied will be described. The communication system may be the 4G communication system (e.g., Long-Term Evolution (LTE) communication system or LTE-A communication system), the 5G communication system (e.g., New Radio (NR) communication system), or the like. The 4G communication system may support communications in a frequency band of 6 GHz or below, and the 5G communication system may support communications in a frequency band of 6 GHz or above as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used in the same sense as a communication network, 'LTE' may refer to '4G communication system', 'LTE communication system', or 'LTE-A communication system', and 'NR' may refer to '5G communication system' or 'NR communication system'.

A wireless communication network to which exemplary embodiments according to the present disclosure are applied will be described. The wireless communication network to which the exemplary embodiments according to the present disclosure are applied is not limited to the contents described below, and the exemplary embodiments according to the present disclosure may be applied to various wireless communication networks. Here, the wireless communication network may be used in the same sense as a wireless communication system.

FIG. 1 is a conceptual diagram illustrating a first exemplary embodiment of a wireless communication network.

Referring to FIG. 1, a wireless communication network 100 may comprise a plurality of communication nodes 110-1, 110-2, 110-3, 120-1, 120-2, 130-1, 130-2, 130-3, 130-4, 130-5, and 130-6. Each of the plurality of communication nodes may support at least one communication protocol. For example, each of the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carder FDMA (SC-FDMA) based communication protocol, a non-orthogonal multiple access (NOMA) based communication protocol, a space division multiple access (SDMA) based communication protocol, or the like. Each of the plurality of communication nodes may have the following structure.

Figure 2:
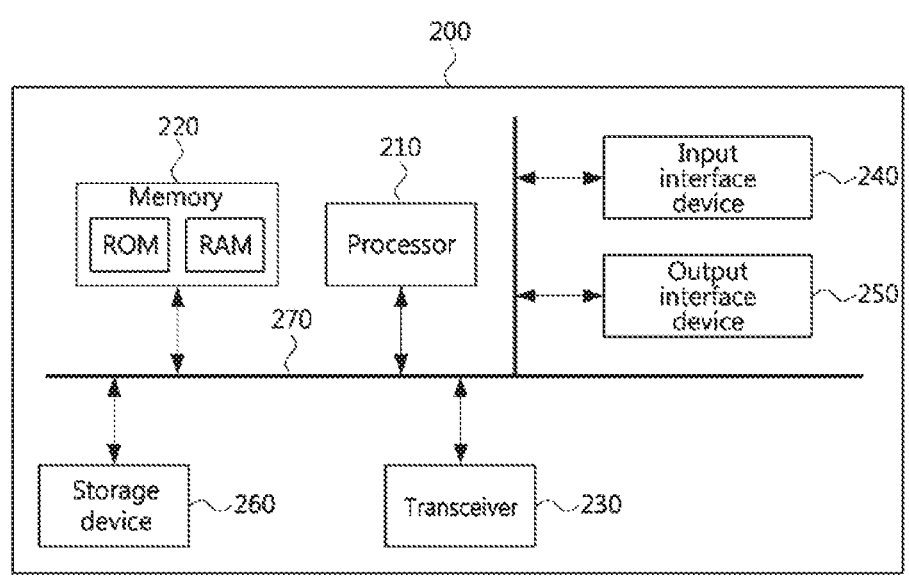
FIG. 2 is a block diagram illustrating a first exemplary embodiment of a communication node constituting a wireless communication network.

FIG. 2 is a block diagram illustrating a first exemplary embodiment of a communication node constituting a wireless communication network.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the wireless communication network 100 may comprise a plurality of base stations 110-1, 110-2, 110-3, 120-1, and 120-2, and a plurality of user equipments (UEs) 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third UE 130-3, and the fourth UE 130-4 may belong to cell coverage of the first base station 110-1. The second UE 130-2, the fourth UE 130-4, and the fifth UE 130-5 may belong to cell coverage of the second base station 110-2. Also, the fifth base station 120-2, the fourth UE 130-4, the fifth UE 130-5, and the sixth UE 130-6 may belong to cell coverage of the third base station 110-3. The first UE 130-1 may belong to cell coverage of the fourth base station 120-1. The sixth UE 130-6 may belong to cell coverage of the fifth base station 120-2.

Here, each of the plurality of base stations 110-1, 110-2, 110-3, 120-1 and 120-2 may refer to a node B (NodeB), an evolved NodeB (eNB), a base transceiver station (BTS), a radio base station, a radio transceiver, an access point, an access node, or the like. Each of the plurality of UEs 130-1, 130-2, 130-3, 130-4, 130-5 and 130-6 may refer to a terminal, an access terminal, a mobile terminal, a station, a subscriber station, a mobile station, a portable subscriber station, a node, a device, or the like.

Each of the plurality of communication nodes 110-1, 110-2, 110-3, 120-1, 120-2, 130-1, 130-2, 130-3, 130-4, 130-5, and 130-6 may support a cellular communication (e.g., long term evolution (LTE), LTE-A (advanced), etc. defined in the 3rd generation partnership project (3GPP) standard), or wireless protocol specifications of mmWave 6

GHz to 80 GHz band) based wireless access technology. Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network (not shown) through the ideal or non-ideal backhaul. Each of the plurality of base stations 110-1, 110-2, 110-3, 120-1, and 120-2 may transmit a signal received from the core network to the corresponding UE 130-1, 130-2, 130-3, 130-4, 130-5, or 130-6, and transmit a signal received from the corresponding UE 130-1, 130-2, 130-3, 130-4, 130-5, or 130-6 to the core network.

In addition, each of the plurality of base stations 110-1, 110-2, 110-3, 120-1, 120-2, 310, 330, 471, and 472 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communication (or, proximity services (ProSe)), or the like. Here, each of the plurality of UEs 130-1, 130-2, 130-3, 130-4, 130-5, 130-6, 410-1, 410-2, 410-3, and 410-4 may perform operations corresponding to the operations of the plurality of base stations 110-1, 110-2, 110-3, 120-1, and 120-2, and operations supported by the plurality of base stations 110-1, 110-2, 110-3, 120-1, 120-2, 310, 330, 431-3, and 431-4. For example, the second base station 110-2 may transmit a signal to the fourth UE 130-4 in the SU-MIMO manner, and the fourth UE 130-4 may receive the signal from the second base station 110-2 in the SU-MIMO manner. Alternatively, the second base station 110-2 may transmit a signal to the fourth UE 130-4 and fifth UE 130-5 in the MU-MIMO manner, and each of the fourth UE 130-4 and fifth UE 130-5 may receive the signal from the second base station 110-2 in the MU-MIMO manner. Each of the first base station 110-1, the second base station 110-2, and the third base station 110-3 may transmit a signal to the fourth UE 130-4 in the CoMP transmission manner, and the fourth UE 130-4 may receive the signal from the first base station 110-1, the second base station 110-2, and the third base station 110-3 in the CoMP manner. Each of the plurality of base stations 110-1, 110-2, 110-3, 120-1, and 120-2 may exchange signals with the corresponding UEs 130-1, 130-2, 130-3, 130-4, 130-5, or 130-6 which belongs to its cell coverage in the CA manner. Each of the base stations 110-1, 110-2, and 110-3 may coordinate D2D communications between the fourth UE 130-4 and the fifth UE 130-5, and thus the fourth UE 130-4 and the fifth UE 130-5 may perform the D2D or V2X services under coordination of each of the second base station 110-2 and the third base station 110-3.

Hereinafter, operation methods of communication nodes in a mobile communication network will be described. Even when a method (e.g., transmission or reception of a signal) to be performed in a first communication node among communication nodes is described, a corresponding second communication node may perform a method (e.g., reception or transmission of the signal) corresponding to the method performed in the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

For the security function, ciphering/deciphering and integrity protection may be performed using a security key generated by various security algorithms. For example, in case of the 3GPP LTE/NR, system, such the security function is performed at a packet data convergence protocol (PDCP) layer.

Figure 3A:
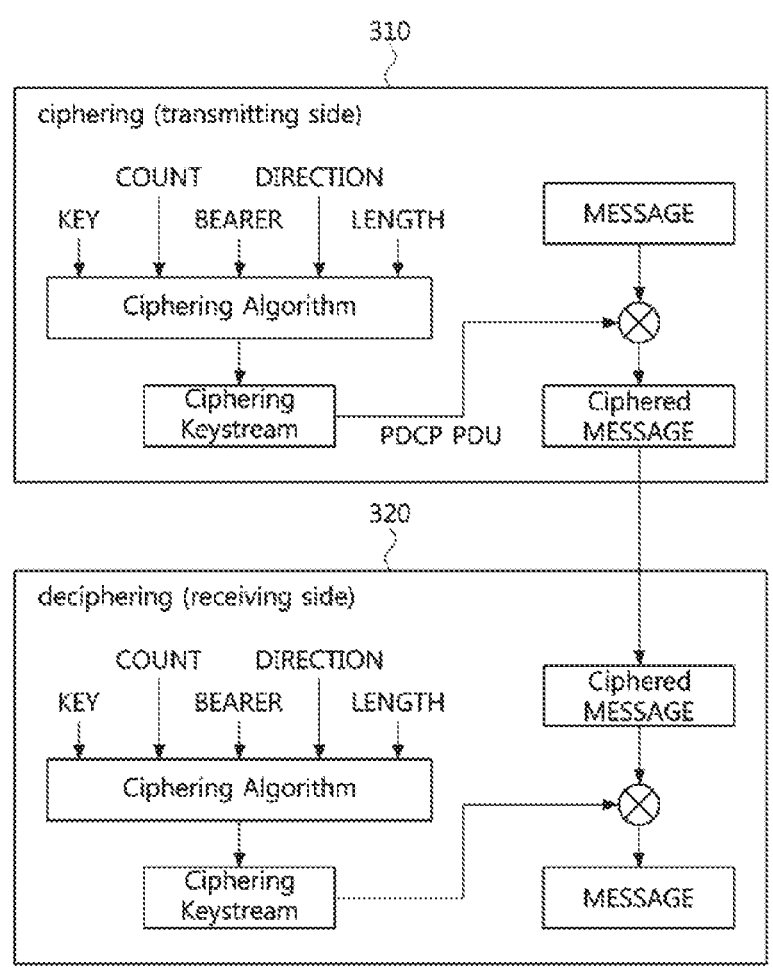
FIGS. 3A and 3B are conceptual diagrams for describing a security operation in a PDCP layer of an LTE/NR system.
Figure 3B:
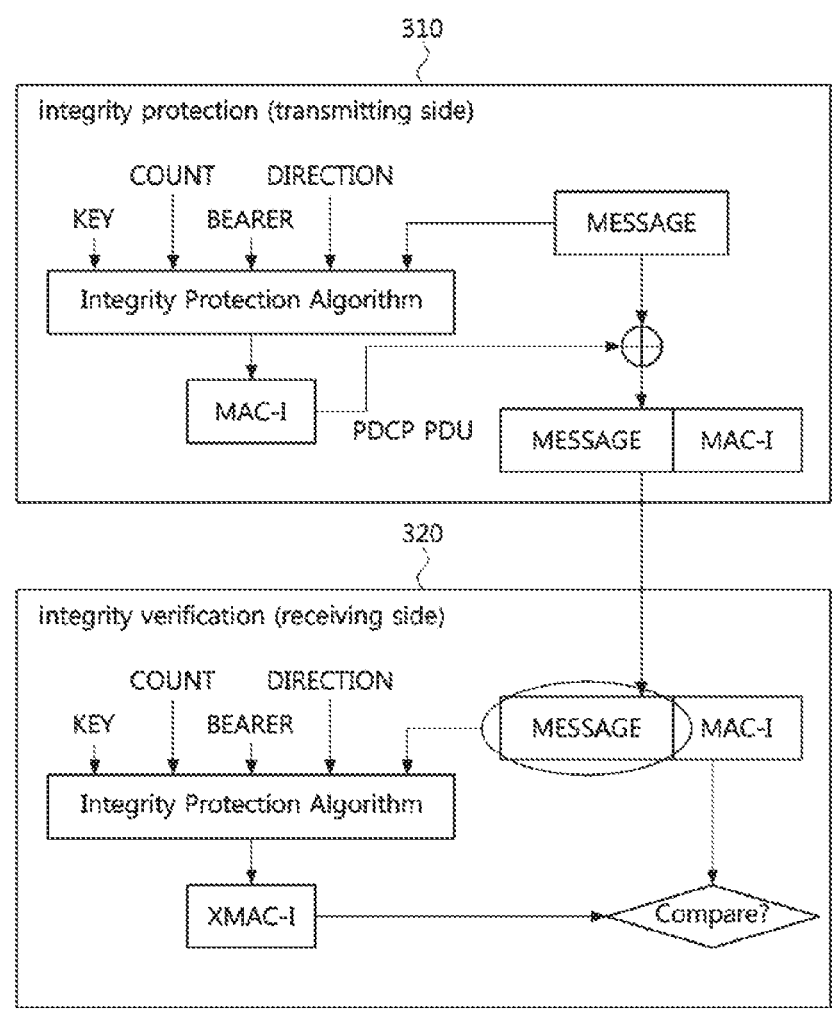

FIGS. 3A and 3B are conceptual diagrams for describing a security operation in a PDCP layer of an LTE/NR system.

Specifically, FIG. 3A is a conceptual diagram illustrating ciphering and deciphering operations performed in PDCP layers of a transmitting side and a receiving side, and FIG. 3B is a conceptual diagram illustrating an integrity protection operation and an integrity verification operation performed in the PDCP layers of the transmitting side and the receiving side.

As shown in FIG. 3A, a PDCP layer 310 of the transmitting side may generate a ciphering keystream by using a pre-generated security key (KEY) and PDCP parameters (a PDCP sequence number (COUNT), a radio bearer ID (BEARER), a transmission direction (uplink or downlink, DIRECTION), and a message length (LENGTH)) related to a message (MESSAGE) to be transmitted. The ciphering may be performed through an exclusive OR (XOR) operation between the generated ciphering keystream and the message to be transmitted, and the message ciphered through the XOR operation may be transmitted to the receiving side through a radio interface. On the other hand, a PDCP layer 320 of the receiving side may generate a ciphering keystream by the same procedure as in the PDCP layer 310 of the transmitting side, and may perform an XOR operation between the generated ciphering keystream and the received message to perform the deciphering of the received message.

As shown in FIG. 3B, the PDCP layer 310 of the transmitting side may generate a MAC-I message by using the pre-generated security key (KEY) and the PDCP parameters (COUNT, BEARER, DIRECTION, LENGTH) related to the message (MESSAGE) to be transmitted. The generated MACI-I message may be attached after the message, and transmitted to the PDCP layer 320 of the receiving side together with the message through a radio interface. On the other hand, the PDCP layer 320 of the receiving side may generate an XMAC-I message by the same procedure as in the PDCP layer 310 of the transmitting side, and may perform integrity verification on the received message by comparing the MACI-I (i.e., the MAC-I generated by the PDCP layer 310 of the transmitting side) and the XMAC-I generated by the PDCP layer 320 of the receiving side.

Meanwhile, whether the message i.e., the deciphered message) derived by performing the XOR operation between the received message and the ciphering keystream is the same as the message (i.e., the message before being ciphered) transmitted by the transmitting side (i.e., whether the deciphering is successful or not) cannot be determined in the deciphering step. Therefore, the success or failure of the deciphering is inferred through a result of the integrity verification and/or a header decompression.

That is, in case of a signaling radio bearer (SRB) to which the integrity protection is applied, the success of the deciphering may be inferred through the integrity verification, and in case of a data radio bearer (DRB) to which the integrity protection is not applied, the success of the deciphering may be inferred through the header decompression.

The above-described security operations at the LTE/NR PDCP layers may cause a security key confusion problem when the PDCP layer itself is changed or the security key is changed. This case will be described with an example in which a handover occurs in a situation where dual connectivity (DC) defined in the 3GPP specification is applied. The handover performed in the situation in which the dual connectivity is applied may be referred to as 'dual connectivity-based (DC-based) handover'.

Figure 4:
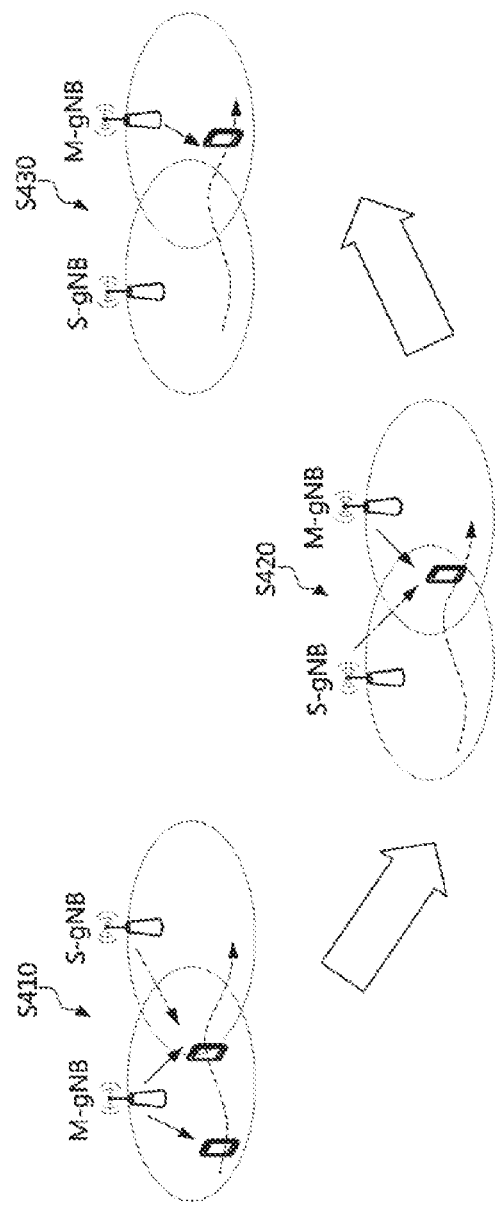
FIG. 4 is a conceptual diagram illustrating a dual connectivity-based handover procedure.

FIG. 4 is a conceptual diagram illustrating a dual connectivity-based handover procedure.

As shown in FIG. 4, a terminal (i.e., user equipment (UE)) may establish two connections simultaneously with a master base station (or, cell) and a secondary base station (or, cell) through a dual connectivity function (S410). Hereinafter, the master base station (or, cell) may be referred to as 'M-gNB', and the secondary base station (or, cell) may be referred to as 'S-gNB'.

In this situation, when the terminal moves from the M-gNB to the S-gNB, the M-gNB and the S-gNB may switch roles with each other (S420). In other words, the M-gNB that was performing a role of the master cell may become a secondary cell, and the S-gNB that was performing a role of the secondary cell may become a master cell. This situation may be called a 'role switch'. In this case, a PDCP layer for a terminal existing only in the M-gNB may be generated also in the S-gNB, and a security procedure performed by the PDCP layer of the M-gNB may be performed by the PDCP layer of the S-gNB from an appropriate time point. Accordingly, the security key may be changed, and since the terminal does not know exactly when the new PDCP layer's security key is activated, a situation in which the terminal cannot know when to apply the new security key to perform the deciphering and integrity verification may occur.

Meanwhile, when the terminal moves further from the S-gNB, the connection with the S-gNB (previous M-gNB) may be released, and the terminal may maintain only the connection with the M-gNB (previous S-gNB) (S430).

Figure 5A:
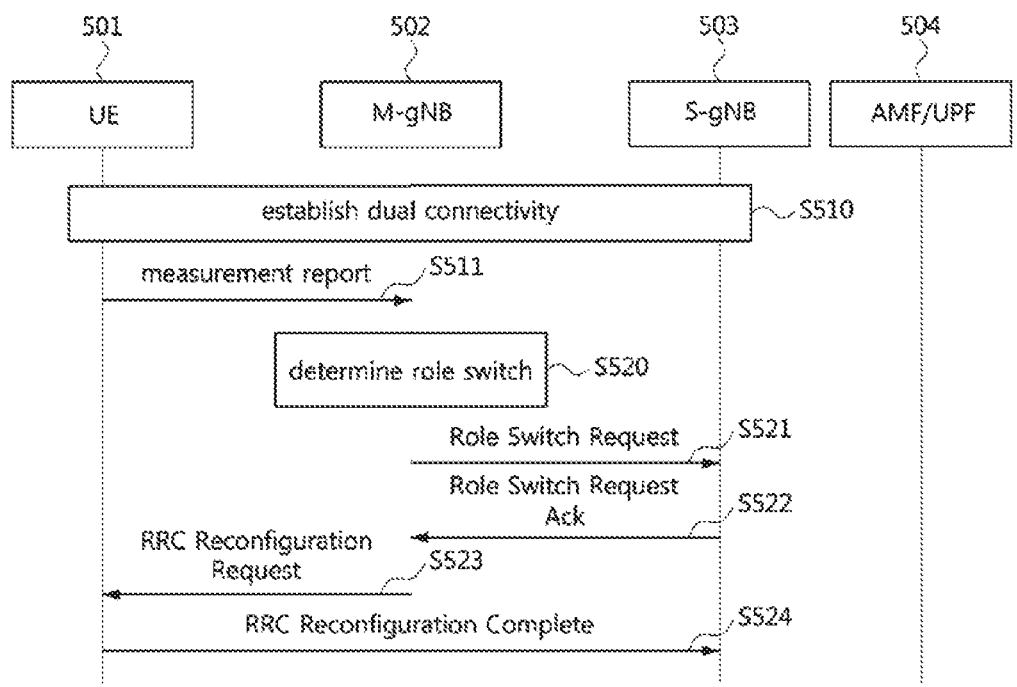
FIGS. 5A and 5B are sequence charts for describing a message flow according to a role switch performed in a dual connectivity-based handover procedure.
Figure 5B:
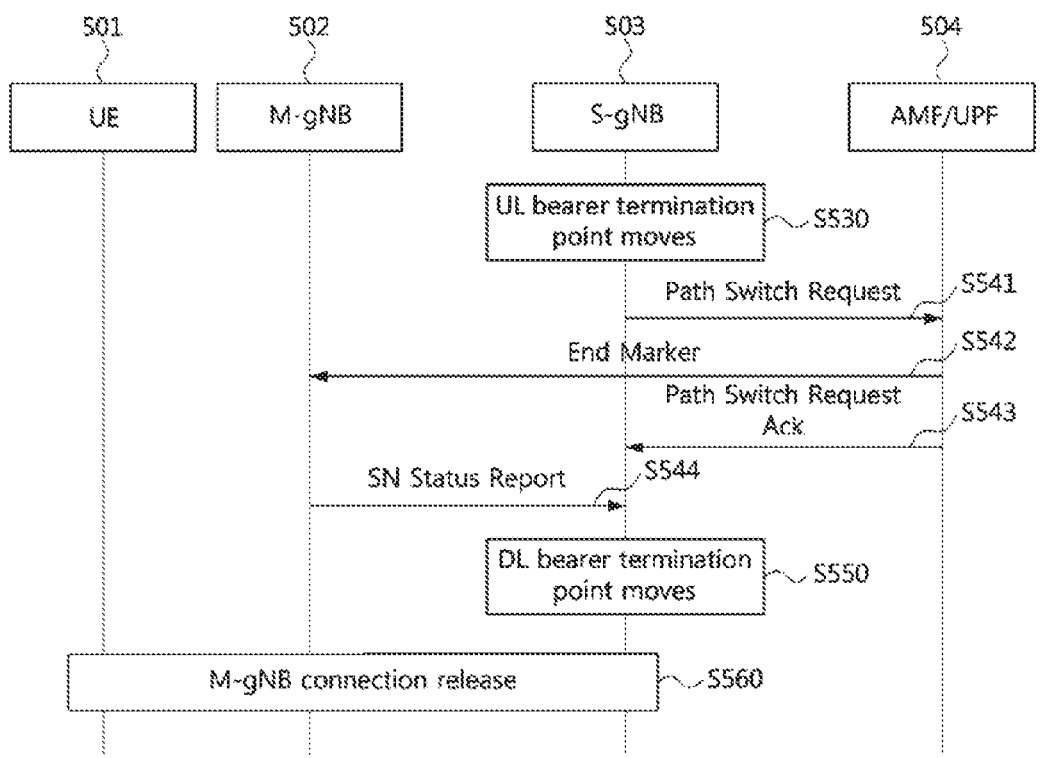

FIGS. 5A and 5B are sequence charts for describing a message flow according to a role switch performed in a dual connectivity-based handover procedure.

In FIGS. 5A and 5B, it is assumed that a terminal 501 is simultaneously connected to an M-gNB 502 and an S-gNB 503 according to a dual connectivity function (S501).

When the terminal transmits a measurement report to the M-gNB (S510), the M-gNB may determine to perform role switching based on the terminal's measurement report (S520). When it is determined to perform the role switching, the S-gNB may be configured to operate as a new M-gNB through message exchange between the M-gNB and the S-gNB. That is, the M-gNB may transmit a role switch request message to the S-gNB (S521), and the S-gNB may transmit a role switch request acknowledgement (ACK) message to the M-gNB in response to the role switch request message received from the M-gNB (S522). Through the message exchange procedure, UE context information for the terminal may be generated in an RRC layer of the S-gNB and a new PDCP layer may be generated in the S-gNB.

The M-gNB may transmit configuration information according to the role switching to the terminal through RRC message (e.g., RRC Reconfiguration Request message) (S523). The terminal may inform the S-gNB that configuration for the role switching has been completed by transmitting an RRC message (e.g., RRC Reconfiguration Complete message) to the S-gNB (S524). From the time when the S-gNB receives the RRC message (i.e., RRC Reconfiguration Complete message) from the terminal, a termination point for uplink (UL) bearers of the terminal may be moved to the PDCP layer of the S-gNB (S530).

The S-gNB may transmit a path switch request message to an AMF/UPF 504 to change a path for downlink t (S541). The AMF receiving the path switching request message may change a data path of the UPF from the M-gNB to the S-gNB, and transmit a path switch request ACK message to the S-gNB (S543).

On the other hand, in the case of downlink (DL) bearers for the terminal, since downlink data to be transmitted from the UPF to the M-gNB may exist before the path switching is performed by the UPF, the PDCP layer of the M-gNB may operate as a termination point of the downlink bearers for the terminal so that the M-gNB processes the downlink data before the M-gNB receives an end marker message from the UPF (S542). Subsequently, upon receiving the end marker message from the UPF (S542), the M-gNB may transmit an SN status report message to the S-gNB to inform that the downlink data processing is completed (S544).

Upon receiving the SN status report message from the M-gNB (S544), the PDCP layer of the S-gNB may operate as the termination point for the downlink hearers (S550), and the S-gNB may directly process downlink data received from the UPF.

Meanwhile, when the terminal moves farther from the existing M-gNB (in the case of S430 in FIG. 4), the terminal may release the connection with the M-gNB (S560). That is, the terminal may maintain only the connection with the S-gNB.

FIGS. 6A to 6D are conceptual diagrams for describing structures of a user plane protocol according to role switching.

Figure 6A:
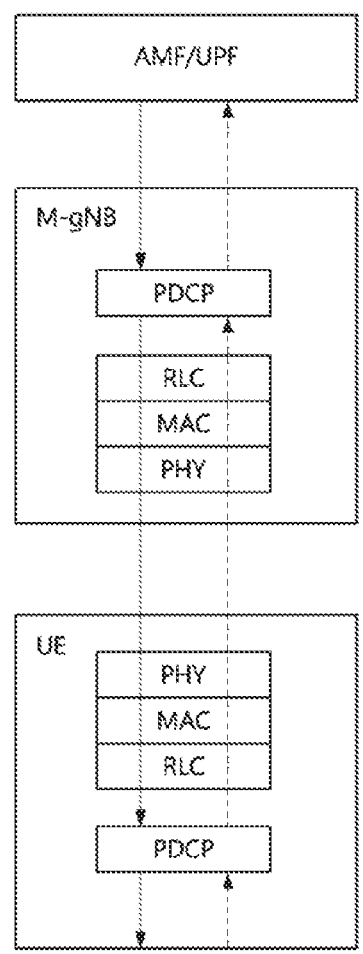
FIGS. 6A to 6D are conceptual diagrams for describing structures of a user plane protocol according to role switching.
Figure 6B:
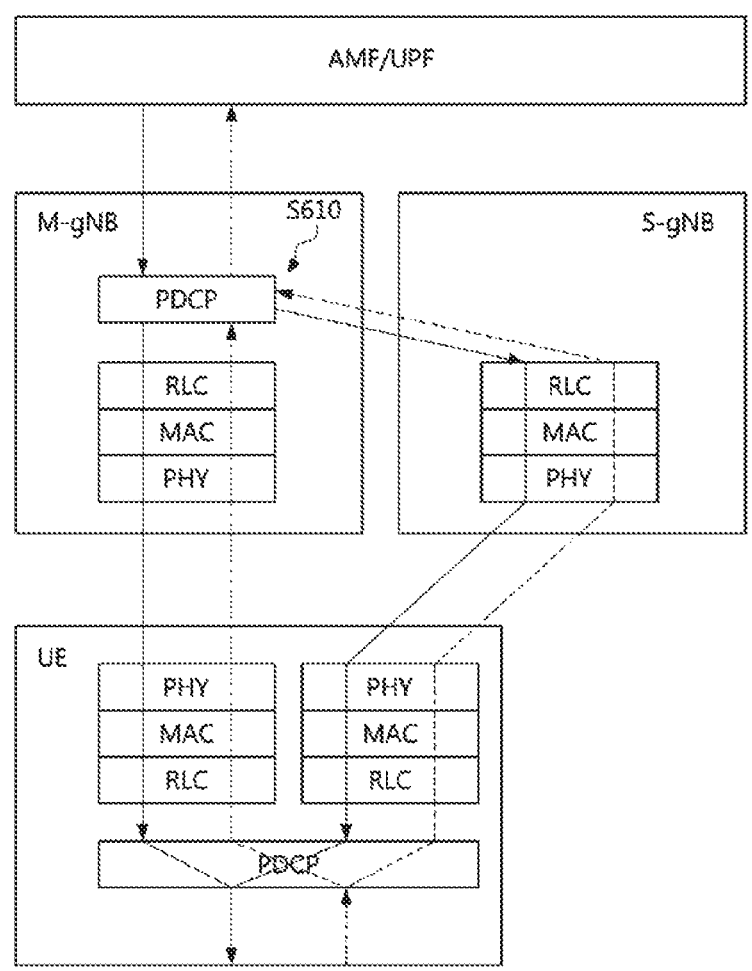
Figure 6C:
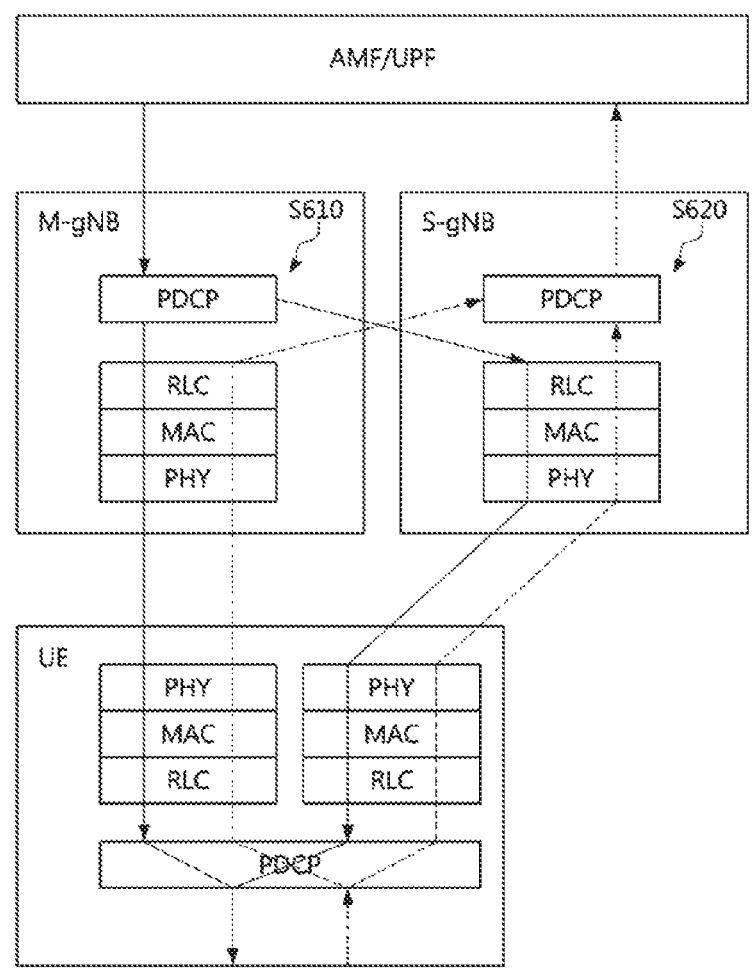
Figure 6D:
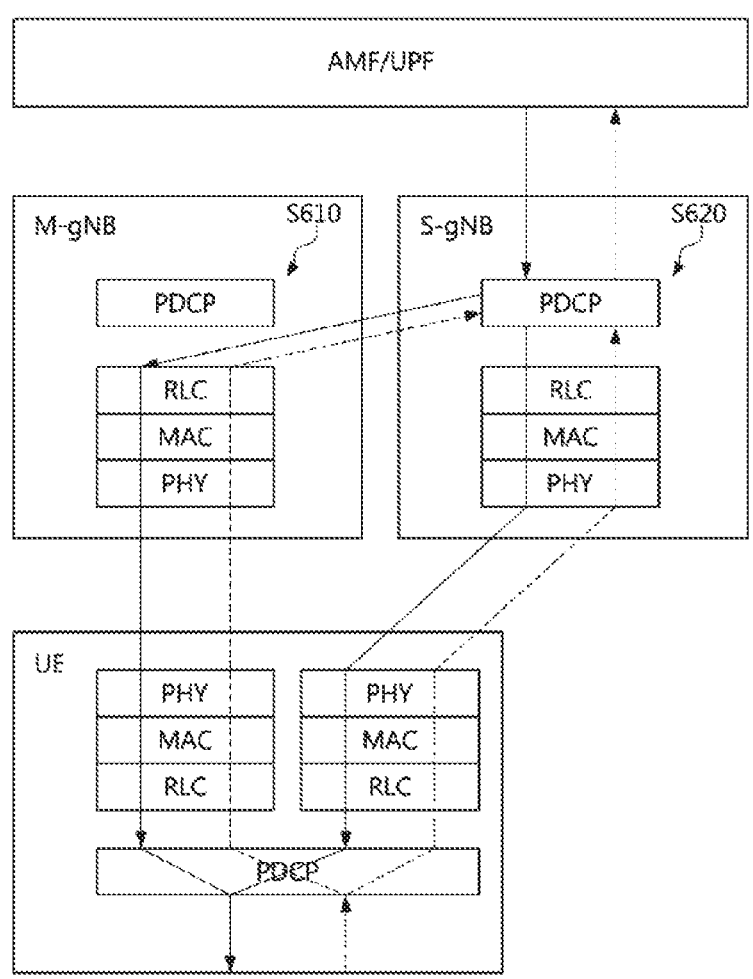

FIG. 6A shows user plane protocol structures in a state in which the terminal maintains a single connectivity with the M-gNB. FIG. 6B shows bearers and protocol structures between the terminal and the gNBs (i.e., M-gNB and S-gNB) according to a normal dual connectivity configuration. In the protocol structures of FIG. 6B, a PDCP layer 610 exists only in the M-gNB. FIG. 6C shows user plane protocol structures in which a PDCP layer for the terminal is generated in the S-gNB and serves as a termination point for uplink bearers in a situation in which role switching between the M-gNB and the S-gNB is performed (i.e., the user plane protocol structures in the step S530 of FIG. 5B). In the protocol structures of FIG. 6C, a PDCP layer 620 may be generated also in the S-gNB. FIG. 6D shows user plane protocol structures in which the PDCP layer of the S-gNB becomes a termination point for downlink bearers in a situation in which role switching between the M-gNB and the S-gNB is performed (i.e., the user plane protocol structures in the step S550 of FIG. 5B).

When the role switching procedure between the M-gNB and the S-gNB is performed, first, the termination point of the uplink bearers may move to the PDCP layer 620 of the S-gNB, as in the protocol structure of FIG. 6C. In this case, the terminal may perform ciphering and integrity protection by applying a new security key. Since the M-gNB and the S-gNB do not know an exact time point from which the new security key is applied, a security key confusion problem may occur.

In addition, as in the protocol structures of FIG. 6D, after the M-gNB receives the end marker message from the UPF, the termination point for the downlink bearers may move to the PDCP layer 620 of the S-gNB. In this case as well, since the terminal does not know the exact time point from which the new security key is applied, the terminal may not know from when to use the new security key to perform ciphering and integrity protection for downlink data.

That is, as the user plane protocol structures are changed from FIG. 6B to FIG. 6C, a security key confusion for the uplink may occur, and as the user plane protocol structures are changed from FIG. 6C to FIG. 6D, a security key confusion for the downlink may occur.

In addition, in the dual connectivity situation, data may be transmitted using two independent bearers for the M-gNB and the S-gNB. Therefore, if the role switching occurs and the security key is changed while RLC retransmissions is being performed due to a transmission error in a bearer, data to which a new security key is applied may be received through one bearer, and data to which a previous security key is applied may be received through another bearer (i.e., bearer for which the RLC retransmission occurs). That is, during the role switching, data to which two security keys are applied may be received as being mixed.

The exemplary embodiments of the present disclosure propose methods for solving the above-mentioned security-related key confusion problem that occurs during the operation of the mobile communication system. According to the exemplary embodiments of the present disclosure, in a situation where the security key confusion may occur, the security key confusion problem can be solved without additional signaling or information exchange between communication nodes. To this end, two security keys (old key and new key) may be used at the same time to perform deciphering, integrity verification, header decompression, etc., and data for which a failure occurs in this process may be ignored, and a subsequent procedure may be performed only for data for which a failure does not occur.

Figure 7:
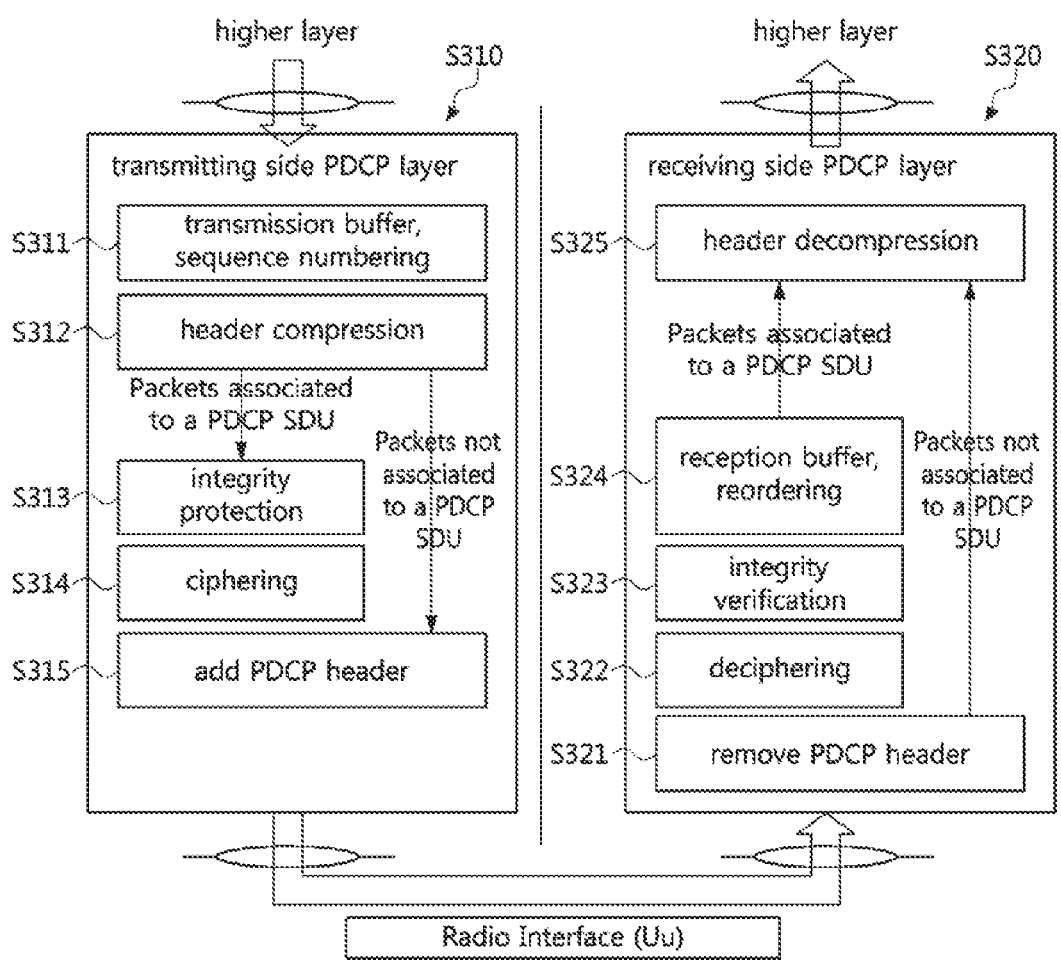
FIG. 7 is a conceptual diagram for describing functional structures of 3GPP PDCP layers.

FIG. 7 is a conceptual diagram for describing functional structures of 3GPP PDCP layers.

As shown in FIG. 7, the PDCP layer 310 of the transmitting side may store data (i.e., PDCP source data unit (SDU)) received from a higher layer in a transmission buffer, and assign a sequence number to the corresponding PDCP SDU (S311). Thereafter, the PDCP layer of the transmitting side may perform header compression (S312), and optionally perform integrity protection (S313) and ciphering (S314). Thereafter, the PDCP layer of the transmitting side may add a PDCP header to the data on which the ciphering and integrity protection have been performed (S315), and deliver a PDCP protocol data unit (PDU) to which the PDCP header has been added to a lower layer (e.g., radio link control (RLC) layer) The PDCP PDU delivered to the RLC layer may be transmitted to an RLC layer of the receiving side through a MAC layer and a PHY layer of the transmitting side and a PHY layer and a MAC layer of the receiving side, and the RLC layer of the receiving side may deliver the PDCP PDU to the PDCP layer 320 of the receiving side.

The PDCP layer 320 of the receiving side may perform a procedure in the reverse order from the procedure performed in the PDCP layer of the transmitting side. That is, the PDCP header may be removed from the received PDCP PDU (S321), and deciphering (S322) and integrity verification (S323) may be optionally performed. Reordering may be performed on the data on which the deciphering and integrity verification have been optionally performed, and the reordered data (i.e., PDCP SDU) may be stored in a reception buffer (S324). Finally, header decompression may be performed for the PDCP SDU (S325).

As described in FIG. 3, since only the XOR operation between the received data and the ciphering keystream is performed in the deciphering procedure performed at the PDCP layer of the receiving side, the terminal cannot determine whether a correct security key has been applied to the data obtained through the deciphering. That is, although the data before the ciphering is applied should be compared with the deciphered data in order to determine whether a correct security key has been applied, the PDCP layer of the receiving side does not have the data before the ciphering is applied. On the other hand, as described in FIG. 3, it can be determined whether a correct security key has been applied by comparing the MAC-I and the XMAC-I in the integrity verification procedure. Therefore, in the case of a bearer to which the integrity protection/verification is applied, it is possible to determine whether a correct security key has been applied through the integrity protection/verification procedure.

For example, according to the 3GPP NR specification, the integrity protection is applied to all signaling radio bearers (SRB), and the integrity protection is selectively applied to data radio bearers (DRB). Therefore, when the integrity protection is applied to a radio bearer to which a PDCP PDU is mapped, it is possible to determine whether a security key applied to the PDCP PDU is an appropriate security key through the integrity verification.

However, when the integrity protection is not applied to the radio bearer to which the PDCP PDU is mapped, another method should be considered. At least one of the following two methods may be applied to PDCP PDUs mapped to the radio bearer to which integrity protection is not applied.

First, a method of temporarily applying the integrity protection to the bearer to which the PDCP PDUs belong may be applied for a predetermined time while a security key confusion occurs (or during a time when the security key confusion is expected). For example, the integrity protection may be applied to the bearer to which PDCP PDUs belong during a time when a dual connectivity-based handover procedure is performed. Alternatively, the integrity protection may be applied to the bearer to which PDCP PDUs belong during a time when a role switching between a master cell and a secondary cell for the terminal is performed.

Second, a method of determining whether an appropriate security key has been applied to the PDCP PDU through header decompression may be applied. For example, after performing the header decompression, only a PDCP SDU for which the header decompression has been successfully completed may be delivered to the higher layer, and a PDCP SDU for which the header decompression has failed may be discarded.

Figure 8:
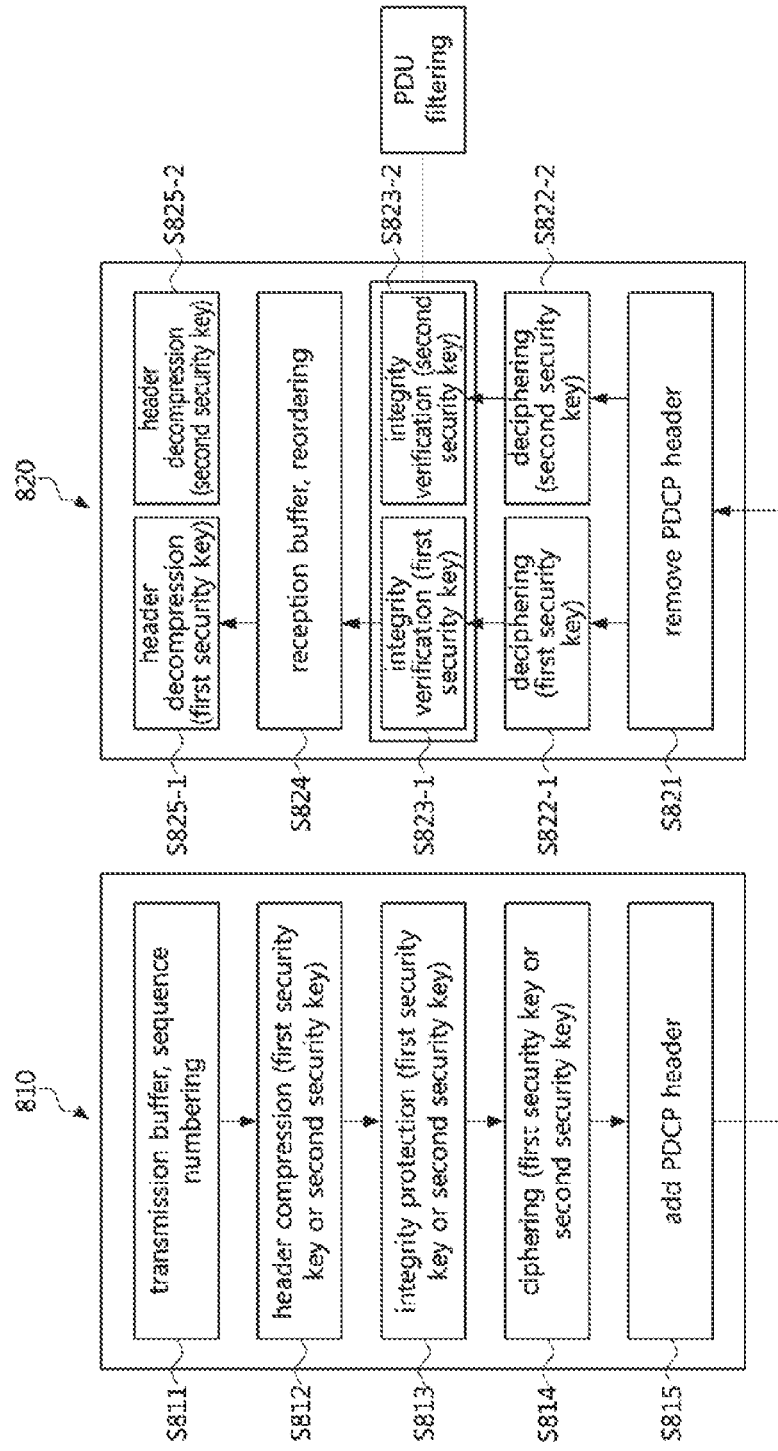
FIG. 8 is a conceptual diagram illustrating a procedure for determining a security key using integrity verification according to an exemplary embodiment of the present disclosure.
Figure 9:
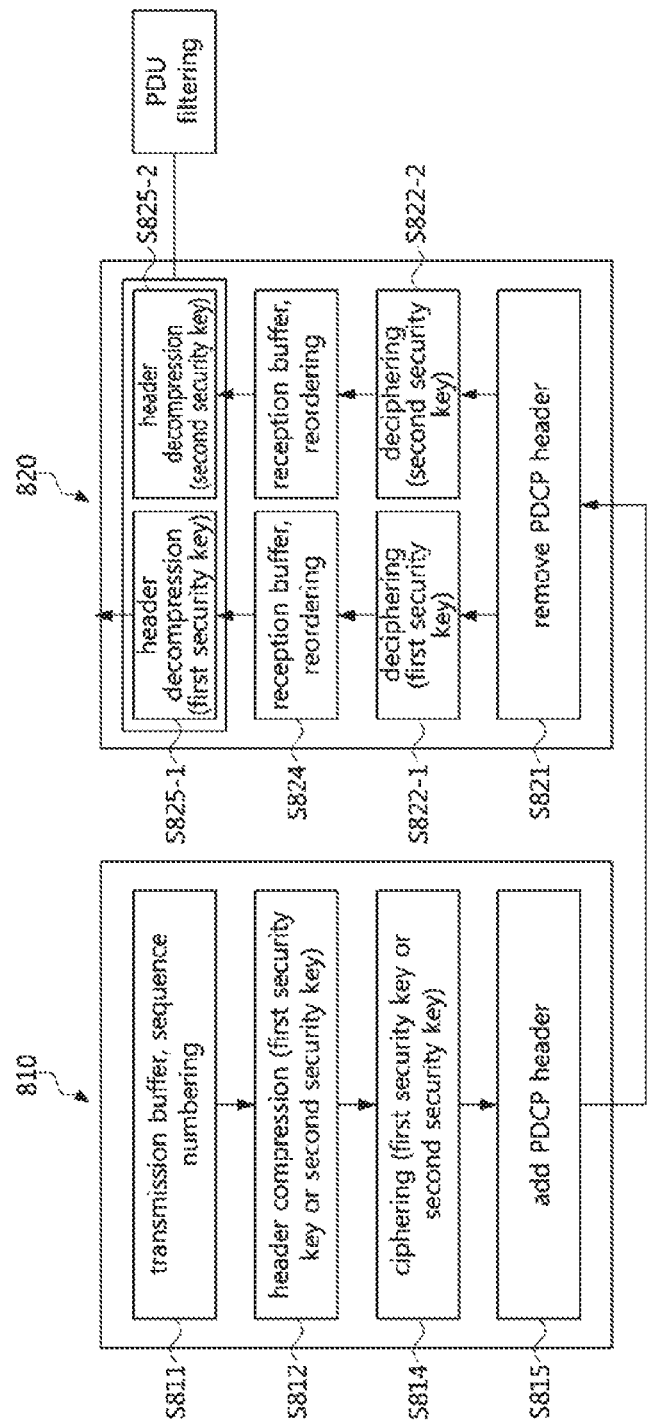
FIG. 9 is a conceptual diagram illustrating a procedure for determining a security key using header decompression according to an exemplary embodiment of the present disclosure.

FIG. 8 is a conceptual diagram illustrating a procedure for determining a security key using integrity verification according to an exemplary embodiment of the present disclosure, and FIG. 9 is a conceptual diagram illustrating a procedure for determining a security key using header decompression according to an exemplary embodiment of the present disclosure.

As shown in FIGS. 8 and 9, a PDCP layer 810 of the transmitting side may perform header compression (S812), integrity protection (S813), and ciphering (S814) by using a first security key (i.e., old key (e.g., security key of the master cell) or a second security key (i.e., new key (e.g., security key of the secondary cell), and transmit a PDCP PDU to which a PDCP header has been added to the receiving side. That is, the PDCP layer 810 of the transmitting side may perform the header compression, integrity protection, and encryption using one of the first security key and the second security key.

On the other hand, a PDCP layer 820 on the receiving side may remove the PDCP header from the PDCP PDU received from the PDCP layer 810 of the transmitting side (S821). Thereafter, the PDCP layer 820 may perform deciphering (S822-1) and integrity verification (S823-1) by applying the first security key. In addition, the PDCP layer 820 of the receiving side may perform deciphering (S822-2) and integrity verification (S823-2) by applying the second security key. That is, the PDCP layer 820 of the receiving side may perform the integrity verification or the header decompression respectively using two security keys (i.e., first security key and second security key) for the received PDCP PDU.

When integrity verification or header decompression using the first security key is successful, the PDCP layer 820 of the receiving side may confirm that the security key applied to the PDCP PDU is the first security key. Alternatively, when integrity verification or header decompression using the second security key is successful, the PDCP layer 820 of the receiving side may confirm that the security key applied to the PDCP PDU is the second security key. Thereafter, the PDCP layer 320 may deliver only the PDCP SDU for the PDCP PDU for which the integrity verification or the header decompression has been successfully completed to the higher layer (i.e., PDU filtering).

On the other hand, if an error occurs in both the integrity verification or the header decompression using the first security key and the integrity verification or the header decompression using the second security key, the PDCP layer may determine that the error is caused by not the security key confusion but another reason. That is, if both the integrity verification and header decompression using the two security keys fail, the PDCP layer may determine that there is an error in the integrity of the PDCP PDU itself. In this case, a predefined procedure (e.g., an error handling procedure) according to the integrity verification or header decompression failure may be performed.

Figure 10:
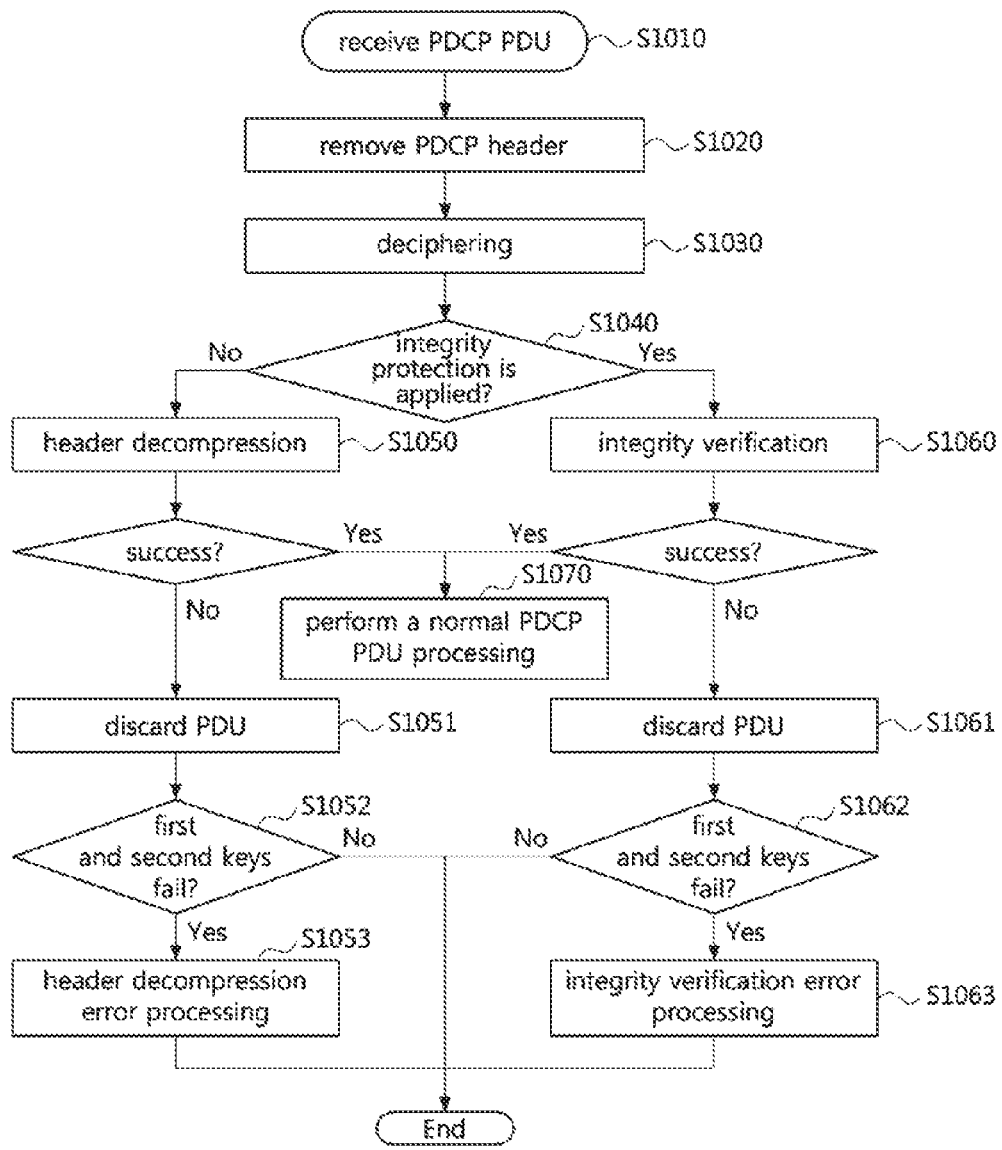
FIG. 10 is a flowchart illustrating an operation procedure of a PDCP layer according to an exemplary embodiment of the present disclosure.

FIG. 10 is a flowchart illustrating an operation procedure of a PDCP layer according to an exemplary embodiment of the present disclosure.

As shown in FIG. 10, the PDCP layer of the receiving side (e.g., terminal) may receive a PDCP PDU from a lower layer (S1010), The PDCP layer may remove a PDCP header from the received PDCP PDU (S1020).

As described in FIG. 3, the PDCP layer may perform deciphering on the received PDCP PDU using a first security key (e.g., a master cell's security key (old key)), and perform deciphering on the received PDCP PDU using a second security key (e.g., a secondary cell's security key (new key)) (S1030).

Then, the PDCP layer may determine whether integrity protection has been applied to the corresponding PDCP PDU (S1040). When integrity protection has not been applied to the corresponding PDCP PDU, header decompression may be performed for the corresponding PDCP PDU (S1050), and when integrity protection has been applied to the PDCP PDU, integrity verification may be performed for the corresponding PDCP PDU (S1060). In this case, in the step S1050, header decompression using the first security key and header decompression using the second security key may be respectively performed, and in the step S1060, integrity verification using the first security key and integrity verification using the second security key may be respectively performed.

If the header decompression using one of the first security key and the second security key is successful in the step S1050, the terminal may perform a normal PDCP PDU processing procedure by using the security key that succeeded in the header decompression (S1070). For example, if the header decompression is successful using the first security key, the normal PDCP PDU processing procedure may be performed using the PDCP PDU deciphered using the first security key. Alternatively, if the header decompression is successful using the second security key, the normal PDCP PDU processing procedure may be performed using the PDCP PDU deciphered using the second security key.

If the integrity verification using one of the first security key and the second security key is successful in the step S1060, the terminal may perform the normal PDCP PDU processing procedure by using the security key that succeeded in integrity verification. For example, when the integrity verification is successful using the first security key, the normal PDCP PDU processing procedure may be performed using the PDCP PDU deciphered using the first security key. Alternatively, if the integrity verification is successful using the second security key, the normal PDCP PDU processing procedure may be performed using the PDCP PDU deciphered using the second security key.

Subsequently, the PDCP PDU deciphered using the security key that failed in the header decompression may be discarded (S1051). For example, if the header decompression is successful using the first security key, the PDCP PDU deciphered using the second security key may be discarded. Alternatively, if the header decompression is successful using the second security key, the PDCP PDU deciphered using the first security key may be discarded.

On the other hand, the PDCP PDU deciphered using the security key that failed in the integrity verification may be discarded (S1061). For example, if the integrity verification is successful using the first security key, the PDCP PDU deciphered using the second security key may be discarded. Alternatively, if the integrity verification is successful using the second security key, the PDCP PDU deciphered using the first security key may be discarded.

If it is determined in the step S1052 that the header decompressions using both the first security key (e.g., old key) and the second security key (e.g., new key) have failed, an error handling procedure for the header decompression may be performed (S1053).

On the other hand, if it is determined in the step S1062 that the integrity verifications using both the first security key (e.g., old key) and the second security key (e.g., new key) have failed, an error handling procedure for the integrity verification may be performed (S1063).

In performing the above-described method, a method of determining how long to apply the deciphering and header decompression and/or integrity verification using two security keys may be further considered. Since the method using the two security keys may incur an overhead in the processing of the PDCP layer of the receiving side (i.e., terminal), it may be desirable to reduce a period of using the two security keys to be as short as possible.

In an exemplary embodiment, in the handover procedure, a security key of the cell with which connection is released, among the cells to which the terminal is dual-connected, may not need to be applied, from a time point at which the connection between the corresponding cell and the terminal is released. However, when the terminal is stationary or moves at a low speed, the terminal may maintain the connection with the cell for a long time, and in this case, the period during which the terminal processes the PDCP PDU using the two security keys may become longer.

Therefore, in another exemplary embodiment, when N (e.g., N is a natural number equal to or greater than 2) or more consecutively received PDCP PDUs succeed in the integrity verification and/or header decompression using a specific security key, a security key other than the specific security key may be deleted.

Alternatively, a predetermined timer may be started from a time point when the integrity verification and/or header decompression using a specific security key succeeds, and when the timer expires, a security key other than the specific security key may be deleted.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A method of managing a security key, performed in a packet data convergence protocol (PDCP) layer of a terminal dual-connected to a first cell and a second cell, the method comprising:
   receiving a PDCP protocol data unit (PDU) on which ciphering or integrity protection to which a first security key of a PDCP layer of the first cell or a second security key of a PDCP layer of the second cell is applied is performed;
   performing at least one of integrity verification and header decompression for the PDCP PDU based on the first security key;
   performing at least one of integrity verification and header decompression for the PDCP PDU based on the second security key,
   wherein, in response to determining that a result of the at least one of integrity verification and header decompression based on the first security key is successful, a security key applied to the PDCP PDU is determined as the first security key, and
   wherein, in response to determining that a result of the at least one of integrity verification and header decompression based on the second security key is successful, the security key applied to the PDCP PDU is determined as the second security key.

2. The method according to claim 1, wherein the method is performed in a situation where a security key confusion occurs.

3. The method according to claim 2, wherein the security key confusion occurs in a handover procedure in which a role of the first cell for the terminal and a role of the second cell for the terminal are switched.

4. The method according to claim 3, wherein the first cell is a master cell, and the second cell is a secondary cell.

5. The method according to claim 1, wherein when the PDCP PDU is mapped to a radio bearer to which integrity protection is applied, the integrity verification based on the first security key and the integrity verification based on the second security key are performed for the PDCP PDU.

6. The method according to claim 1, wherein when the PDCP PDU is mapped to a radio bearer to which integrity protection is not applied, integrity protection is applied to the radio bearer to which the PDCP PDU is mapped for a predetermined time, and the integrity verification based on the first security key and the integrity verification based on the second security key are performed for the PDCP PDU.

7. The method according to claim 6, wherein the predetermined time is a time during which a dual connectivity-based handover procedure is performed or a time during which a procedure for switching a role of the first cell for the terminal and a role of the second cell for the terminal is performed.

8. The method according to claim 1, further comprising delivering data deciphered by the first security key to a higher layer when the security key applied to the PDCP PDU is the first security key, and delivering data deciphered by the second security key to the higher layer when the security key applied to the PDCP PDU is the second security key.

9. The method according to claim 1, further comprising, when errors occur in both the integrity verification or header decompression based on the first security key and the integrity verification or header decompression based on the second security key for the PDCP PDU, performing an error handling procedure.

10. The method according to claim 1, wherein the first security key or the second security key is deleted:
   at a time point when a release procedure for the first cell or the second cell is performed;
   at a time point when one of the first security key and the second security key is determined as being applied to N or more consecutively received PDCP PDUs, wherein N is a natural number equal to or greater than 2; or
   after a lapse of a predetermined time from a time point when a PDCP PDU to which a previous security key is applied is processed.

11. A terminal in a mobile communication system, the terminal comprising:
   a processor;
   a memory electronically communicating with the processor; and
   instructions stored in the memory and executable by the processor,
   wherein when executed by the processor, the instructions cause a packet data convergence protocol (PDCP) layer of the terminal to perform a security key management method, and the security key management method comprises:
   receiving a PDCP protocol data unit (PDU) on which ciphering or integrity protection to which a first security key of a PDCP layer of the first cell or a second security key of a PDCP layer of the second cell is applied is performed;
   performing at least one of integrity verification and header decompression for the PDCP PDU based on the first security key;
   performing at least one of integrity verification and header decompression for the PDCP PDU based on the second security key, wherein, in response to determining that a result of the at least one of integrity verification and header decompression based on the first security key is successful, a security key applied to the PDCP PDU is determined as the first security key, and wherein, in response to determining that a result of the at least one of integrity verification and header decompression based on the second security key is successful, the security key applied to the PDCP PDU is determined as the second security key.

12. The terminal according to claim 11, wherein the security key management method is performed in a situation where a security key confusion occurs.

13. The terminal according to claim 12, wherein the security key confusion occurs in a handover procedure in which a role of the first cell for the terminal and a role of the second cell for the terminal are switched.

14. The terminal according to claim 13, wherein the first cell is a master cell, and the second cell is a secondary cell.

15. The terminal according to claim 11, wherein when the PDCP PDU is mapped to a radio bearer to which integrity protection is applied, the integrity verification based on the first security key and the integrity verification based on the second security key are performed for the PDCP PDU.

16. The terminal according to claim 11, wherein when the PDCP PDU is mapped to a radio bearer to which integrity protection is not applied, integrity protection is applied to the radio bearer to which the PDCP PDU is mapped for a predetermined time, and the integrity verification based on the first security key and the integrity verification based on the second security key are performed for the PDCP PDU.

17. The terminal according to claim 16, wherein the predetermined time is a time during which a dual connectivity-based handover procedure is performed or a time during which a procedure for switching a role of the first cell for the terminal and a role of the second cell for the terminal is performed.

18. The terminal according to claim 11, wherein the security key management method further comprises delivering data deciphered by the first security key to a higher layer when the security key applied to the PDCP PDU is the first security key, and delivering data deciphered by the second security key to the higher layer when the security key applied to the PDCP PDU is the second security key.

19. The terminal according to claim 11, wherein the security key management method further comprises, when errors occur in both the integrity verification or header decompression based on the first security key and the integrity verification or header decompression based on the second security key for the PDCP PDU, performing an error handling procedure.

20. The terminal according to claim 11, wherein the first security key or the second security key is deleted:
- at a time point when a release procedure for the first cell or the second cell is performed;
- at a time point when one of the first security key and the second security key is determined as being applied to N or more consecutively received PDCP PDUs, wherein N is a natural number equal to or greater than 2; or
- after a lapse of a predetermined time from a time point when a PDCP PDU to which a previous security key is applied is processed.

* * * * *